United States Patent
Bellaouar et al.

(10) Patent No.: US 7,359,684 B2
(45) Date of Patent: Apr. 15, 2008

(54) WIRELESS COMMUNICATION SYSTEM WITH VARIABLE INTERMEDIATE FREQUENCY TRANSMITTER

(75) Inventors: Abdellatif Bellaouar, Dallas, TX (US); Jeff D. Laster, Richardson, TX (US); Charles Gore, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 964 days.

(21) Appl. No.: 10/012,869

(22) Filed: Nov. 6, 2001

(65) Prior Publication Data

US 2003/0087613 A1    May 8, 2003

(51) Int. Cl.
- *H04B 1/04* (2006.01)
- *H04B 1/40* (2006.01)
- *H04B 1/02* (2006.01)
- *H04M 1/00* (2006.01)

(52) U.S. Cl. .......................... 455/118; 455/76; 455/77; 455/102; 455/120; 455/260; 455/552.1

(58) Field of Classification Search ............. 455/550.1, 455/313, 333, 293, 91, 118, 76, 77, 102, 120, 455/260, 552.1
See application file for complete search history.

(56) References Cited

U.S. PATENT DOCUMENTS

| | | | | |
|---|---|---|---|---|
| 6,084,448 A | * | 7/2000 | Koszarsky | 327/156 |
| 6,175,746 B1 | * | 1/2001 | Nakayama et al. | 455/552.1 |
| 6,566,786 B2 | * | 5/2003 | Nguyen | 310/309 |
| 6,735,426 B1 | * | 5/2004 | Pau | 455/255 |
| 6,987,951 B2 | * | 1/2006 | Boos | 455/85 |
| 2001/0036838 A1 | * | 11/2001 | Higuchi | 455/552 |

FOREIGN PATENT DOCUMENTS

| | | |
|---|---|---|
| EP | 1 148 654 A1 | 10/2001 |
| GB | 524 776 A | 8/1940 |

OTHER PUBLICATIONS

"Complete Dual-Band Transmitters", Maxim Integrated Products, 'Online', Oct. 30, 2000, pp. 1-24, XP002253455 (retrieved from the Internet: URL:http://pdfserv.maxim-1c.com/en/ds/MAX2360-MAX2364.pdf, retrieved on Sep. 4, 2003.

* cited by examiner

*Primary Examiner*—Barry Taylor
(74) *Attorney, Agent, or Firm*—Ronald O. Neerings; Wade James Brady, III; Frederick J. Telecky, Jr.

(57) ABSTRACT

A wireless communication device (UST), comprising an input for receiving baseband data (I, Q) in a first signal having a first frequency. The device also comprises circuitry ($68_1$, $68_2$) for increasing the first frequency, to form a second signal having a second frequency, in response to a first frequency reference signal ($IF_2$), and the device comprises circuitry (74) for increasing the second frequency, to form a third signal having a third frequency, in response to a second frequency reference signal ($LO_2$). Lastly, the device comprises an antenna ($ATU_2$) for transmitting the baseband data at a final transmission frequency selected as a band within a predetermined set of frequency bands. With reference to the preceding, the first frequency reference signal and the second frequency reference signal are variable and are selected in response to the final transmission frequency which is a particular band selected as a different band at different times and from the predetermined set of frequency bands.

24 Claims, 3 Drawing Sheets

| | COLUMN 1 | COLUMN 2 | COLUMN 3 | COLUMN 4 | COLUMN 5 | COLUMN 6 |
|---|---|---|---|---|---|---|
| | STANDARD | MINIMUM FREQUENCY [MHz] | MAXIMUM FREQUENCY [MHz] | RESOLUTION BANDWIDTH | DESIGN @ ANTENNA [dBm] | MIN. REQ. @ ANTENNA [dBm] |
| ROW 1 | 3GPP TX | 1920 | 1980 | 3.84 MHz | −26 | −19 |
| ROW 2 | 3GPP RX | 2110 | 2170 | 3.84 MHz | −141 | −131 |
| ROW 3 | 3GPP | 9 kHz | 150 kHz | 1 kHz | −56 | −36 |
| ROW 4 | 3GPP | 150 kHz | 30 | 10 kHz | −56 | −36 |
| ROW 5 | 3GPP | 30 | 1000 | 100 kHz | −56 | −36 |
| ROW 6 | 3GPP | 1 GHz | 12.75 GHz | 1 MHz | −36 | −30 |
| ROW 7 | UMTS | 1893.5 | 1919.6 | 300 kHz | −46 | −41 |
| ROW 8 | EGSM RX | 925 | 935 | 100 kHz | −76 | −67 |
| ROW 9 | GSM RX | 935 | 960 | 100 kHz | −86 | −79 |
| ROW 10 | DCS RX | 1805 | 1880 | 100 kHz | −76 | −71 |
| ROW 11 | BLUETOOTH | 2402 | 2480 | 1 MHz | −86 | −80 |
| ROW 12 | GPS | 1573 | 1578 | 1 MHz | −116 | −110 |

TABLE 2

FIG. 6

| | COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|---|
| | | | WORST SPUR FOR 3GPP TX AND RX BANDS | | | WORST SPUR FOR ALL BANDS | | |
| | TX [MHz] | $IF_2$ [MHz] | LO ORDER | IF ORDER | SPUR [MHz] | LO ORDER | IF ORDER | SPUR [MHz] |
| ROW 1 | 1922.4 | 399 | −2 | 17 | 2140.2 | −2 | 7 | 1849.8 |
| ROW 2 | 1927.4 | 401 | −2 | 17 | 2160.2 | 0 | 6 | 2406 |
| ROW 3 | 1932.4 | 402 | −2 | 17 | 2165.2 | 0 | 6 | 2412 |
| ROW 4 | 1937.4 | 399 | −2 | 17 | 2110.2 | −2 | 7 | 1879.8 |
| ROW 5 | 1942.4 | 399 | −3 | 23 | 2152.8 | −1 | 12 | 2446.6 |
| ROW 6 | 1947.4 | 400 | −3 | 23 | 2157.8 | −2 | 7 | 1894.8 |
| ROW 7 | 1952.4 | 399 | −3 | 23 | 2122.8 | −2 | 7 | 1909.8 |
| ROW 8 | 1957.4 | 400 | −3 | 23 | 2127.8 | −2 | 7 | 1914.8 |
| ROW 9 | 1962.4 | 403 | −2 | 17 | 2120.2 | 0 | 6 | 2412 |
| ROW 10 | 1967.4 | 404 | −2 | 17 | 2125.2 | 0 | 6 | 2424 |
| ROW 11 | 1972.4 | 406 | −2 | 17 | 2145.2 | 0 | 6 | 2436 |
| ROW 12 | 1977.4 | 408 | −2 | 17 | 2165.2 | 0 | 6 | 2448 |

TABLE 1

FIG. 5

WIRELESS COMMUNICATION SYSTEM WITH VARIABLE INTERMEDIATE FREQUENCY TRANSMITTER

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to such a system including a transmitter implementing a variable intermediate frequency in its upconverter.

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." CDMA systems are characterized by simultaneous transmission of different data signals over a common channel by assigning each signal a unique code. CDMA continues to advance along with corresponding standards that have brought forth a next generation wideband CDMA ("WCDMA") and which has a 3GPP standard.

Also with the prevalence and advancement of wireless devices, commercial competition proceeds at a considerably rapid pace. In the competitive marketplace, considerations are made in numerous aspects of devices as well as communication standards and protocols. Additionally, consumer demands and expectations are heavily considered. As a result, factors such as incremental costs, device size, reliability, and longevity are all important in the development of wireless devices.

Figure 1:
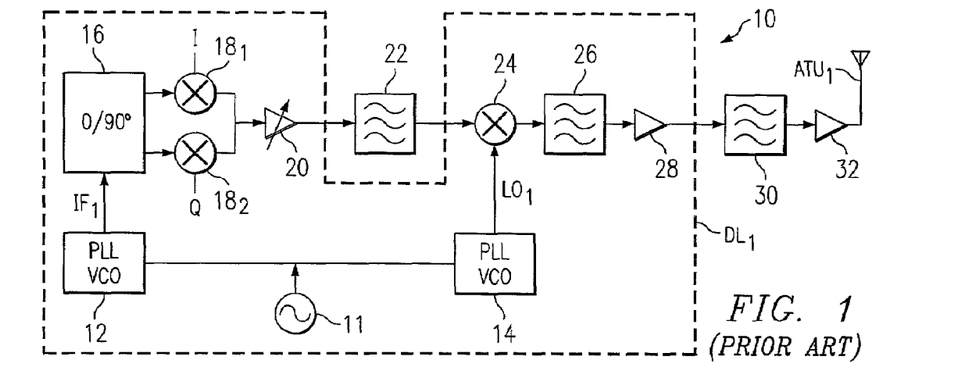
FIG. 1 illustrates an electrical block diagram of a prior art up-converter.

Given the preceding, the present art includes a transmitter device that includes various functional blocks, one of which is typically referred to as an up-converter. By way of further background, FIG. 1 illustrates an electrical block diagram of such a prior art up-converter designated generally at 10, and which is typically included as part of the functional circuitry of a transmitter. Up-converter 10 includes a reference frequency generator 11 that provides a reference frequency to a first phase-locked-loop ("PLL") voltage-controlled oscillator ("VCO") 12 and also to a second PLL VCO 14. First PLL VCO 12 outputs a fixed intermediate frequency ("$IF_1$") to an input of a quadrature generator 16. In the prior art where up-converter 10 is used in a WCDMA design, $IF_1$ is set to 380 MHz. The output of quadrature generator 16 is connected to mixers $18_1$ and $18_2$, each of which receives a respective baseband input I and Q. Quadrature generator 16 produces two signals at the same frequency, namely, at the frequency of $IF_1$, where those two signals are separated from one another by a ninety degree phase shift. These two signals are connected to respective mixers $18_1$ and $18_2$, thereby adjusting the baseband frequency of each of I and Q based on $IF_1$. The outputs of mixers $18_1$ and $18_2$ are combined and then connected to an input of a variable gain amplifier 20, which has its output connected to an input of a first surface acoustic wave ("SAW") filter 22 as further discussed below.

With respect to the connection to the input of SAW filter 22, it is noted that FIG. 1 also includes a dashed line $DL_1$ encompassing various of the blocks of up-converter 10. Dashed line $DL_1$ is intended to illustrate the boundaries of an integrated circuit used to implement up-converter 10 in the prior art, that is, in the prior art, all blocks within dashed line $DL_1$ are included in a single integrated circuit. Thus, returning to SAW filter 22, note now that it is external from the single integrated circuit represented by dashed line $DL_1$. Accordingly, the above-discussed connection to the input of SAW filter 22 requires an external connection from the integrated circuit bounded by dashed line $DL_1$. The output of SAW filter 22 is connected as an input to a mixer 24 that is within the integrated circuit represented by dashed line $DL_1$. Thus, this connection also requires an external connection with respect to the integrated circuit.

Returning to blocks within the above-introduced integrated circuit, mixer 24 receives at another input a local oscillator signal ("$LO_1$") from second PLL VCO 14. In the prior art, $LO_1$ is variable so that it may be selected based on one of various different WCDMA transmission channels, where the different channels are from a set of channels in a transmission band spanning 1922.4 through 1977.4 MHz. Specifically, $LO_1$ is chosen so that the sum of frequencies provided by $IF_1$ and $LO_1$ is equal to the final transmission channel frequency. More particularly, in WCDMA, each transmission channel is 3.84 MHz wide (i.e., it has a 3.84 MHz bandwidth), and each WCDMA transmitter is operable to transmit along any of these channels. Typically, a given transmitter operates to transmit along one of these channels according to the cell in which the transmitter is located, while the transmitter adjusts to transmit along a different channel when the transmitter is re-located to a different cell. The channels are selected from the WCDMA transmission band spanning 1922.4 through 1977.4 MHz. For example, while in a first cell, the transmitter may transmit information along a final transmission channel frequency of 1922.4 MHz; in this case, $LO_1$ is set to provide such an output. Particularly, assuming low side frequency injection (i.e., $LO_1$<final transmission frequency) by mixer 24, then at this time second PLL VCO 14 outputs $LO_1$ at a frequency of 1542.4 MHz so that it is combined with the $IF_1$ frequency of 380 MHz to provide a final transmission channel frequency of 1922.4 MHz (i.e., $IF_1+LO_1$=380 MHz+1542.4 MHz=1922.4 MHz). As another example, while in a second cell, the transmitter may transmit information along a final transmission channel frequency of 1932.4 MHz; in this case, and again assuming low side frequency injection by mixer 24, then at this time second PLL VCO 14 outputs $LO_1$ at a frequency of 1552.4 MHz so that it is combined with the $IF_1$ frequency of 380 MHz to provide a final transmission channel frequency of 1932.4 MHz (i.e., $IF_1+LO_1$=380 MHz+1552.4 MHz=1932.4 MHz). Given these examples, one skilled in the art will recognize that $LO_1$ will range, for low side injection in WCDMA, from 1542.4 MHz to 1597.4 MHz. Thus, for any instance in this range, $LO_1$ is provided to mixer 24, thereby adding the frequency of $LO_1$ to the $IF_1$ frequency of 380 MHz, and the output is connected as an input to an image reject filter 26. Image reject filter 26 is less complex than SAW filter 22 and, as a result, it is feasibly integrated within dashed line $DL_1$. The output of image reject filter 26 is connected as an input to a driver 28, and the output of driver 28 is output from dashed line $DL_1$ and, thus, is connected externally from the integrated circuit represented by dashed line $DL_1$. More specifically, the output of driver 28 is connected as an input to a second SAW filter 30. The output of second SAW filter 30 is connected as an input to a power amplifier 32. The output of power amplifier 32 is connected to an antenna $ATU_1$. Lastly, although not shown, up-converter 10 is typically not only part of a transmitter, but that transmitter is usually accompanied by a receiver circuit or circuitry as well. In this regard, the output of power amplifier 32 is also typically connected to a duplex circuit and returned to the receiver circuit so that the signals for transmission may be suppressed with respect to the receiver functionality so as not to interfere with the receiver that is part of the same overall device.

The operation of up-converter 10 is generally as follows. Quadrature generator 16 provides appropriate phase shifted signals, and having a frequency equal to $IF_1$, to mixers $18_1$ and $18_2$. Mixers $18_1$ and $18_2$ also receive the baseband signals I and Q. As a result, the frequency of each pair of signals into a mixer are summed to add the 380 MHz $IF_1$ frequency to the respective baseband signal; thus, in up-converter 10 this provides a first increase in the frequency of the baseband signal. The result is amplified by variable gain amplifier 20, and note that the variability of that amplifier allows adjustments, for example, for reasons such as the distance between a wireless base station and the unit that includes up-converter 10. Due to the first frequency multiplication of mixers $18_1$ and $18_2$ and also due to the amplification from amplifier 20, various spurious frequencies are introduced into the resulting signal. Indeed, it is recognized that as the signal is further processed through up-converter 10 and its frequency is modified further for final transmission, these spurious signals can negatively affect other devices operating in both the WCDMA band as well as in other wireless bands (e.g., UMTS, EGSM, GSM, DCS, Bluetooth, and GPS). As a result, SAW filter 22 is provided so as to reduce such spurious frequencies. In other words, SAW filter 22 reduces or removes any harmonic frequencies of the 380 MHz $IF_1$ frequency (i.e., integer multiplies of 380 MHz for integers greater than one). In addition, SAW filter 22 reduces noise from the signal. Since the output of SAW filter 22 is connected to mixer 24, then its frequency is again adjusted, this time based on $LO_1$; thus, in up-converter 10 this provides a second increase in the frequency of the baseband signal. Recall that in FIG. 1 this adjustment is a low side injection, that is, the $LO_1$ frequency is less than the final transmission channel frequency and the $LO_1$ frequency is summed with $IF_1$ to reach the final transmission channel frequency (i.e., the final transmission channel frequency is provided by $LO_1+IF_1$). As known in the art, however, the multiplication by mixer 24 necessarily also produces the difference of these two frequencies, namely, $|LO_1-IF_1|$. Image reject filter 26 therefore removes this differential frequency and, thus, allows only the summed frequency to pass. Alternatively, if up-converter 10 implemented high side injection (i.e., $LO_1$>final transmission channel frequency), then image reject filter 26 removes the summed frequency and allows the differential frequency to pass. For either the high side or low side injection case, after filter 26 the signal is amplified by driver 28 to a value sufficient to drive the input requirements of power amplifier 32. Before reaching power amplifier 32, second SAW filter 30 reduces any remaining spurious frequencies and noise from the signal after which it is amplified by power amplifier 32 and transmitted via antenna $ATU_1$.

While up-converter 10 of FIG. 1 has proven acceptable in the past, the present inventors have observed that it has various drawbacks. For example, recall that up-converter 10 includes both an integrated circuit that performs a portion of the up-converter functionality as well as various external devices coupled to the integrated circuit to complete the up-converter functionality. In the example of FIG. 1, the external devices include at least two discrete filters, namely, SAW filters 22 and 30, which are commercially available from numerous sources. The present inventors have observed that the use of these SAW filters, while functionally sufficient, may provide various drawbacks. For example, each externally required SAW filter increases, beyond the integrated circuit, the overall space and weight required to implement the up-converter functionality. As another and perhaps more critical example, each SAW filter adds to the overall cost to implement the up-converter functionality, and any incremental cost in the extremely competitive marketplace that currently exists can be critical as to the viability of the device that implements the up-converter functionality. Still other drawbacks may be ascertained by one skilled in the art.

In view of the above, there arises a need to address the drawbacks of the prior art as is achieved by the preferred embodiments described below.

BRIEF SUMMARY OF THE INVENTION

In the preferred embodiment, there is a wireless communication device, comprising an input for receiving baseband data in a first signal having a first frequency. The device also comprises circuitry for increasing the first frequency, to form a second signal having a second frequency, in response to a first frequency reference signal, and the device comprises circuitry for increasing the second frequency, to form a third signal having a third frequency, in response to a second frequency reference signal. Lastly, the device comprises an antenna for transmitting the baseband data at a final transmission channel frequency selected as a channel from among a band comprising a predetermined set of frequency channels. With reference to the preceding, the first frequency reference signal and the second frequency reference signal are variable and are selected in response to the final transmission channel frequency. Other circuits, systems, and methods are also disclosed and claimed.

DETAILED DESCRIPTION OF THE INVENTION

FIG. 1 was discussed in the earlier Background Of The Invention section of this document in connection with the prior art and the reader is assumed familiar with the principles of that discussion.

Figure 2:
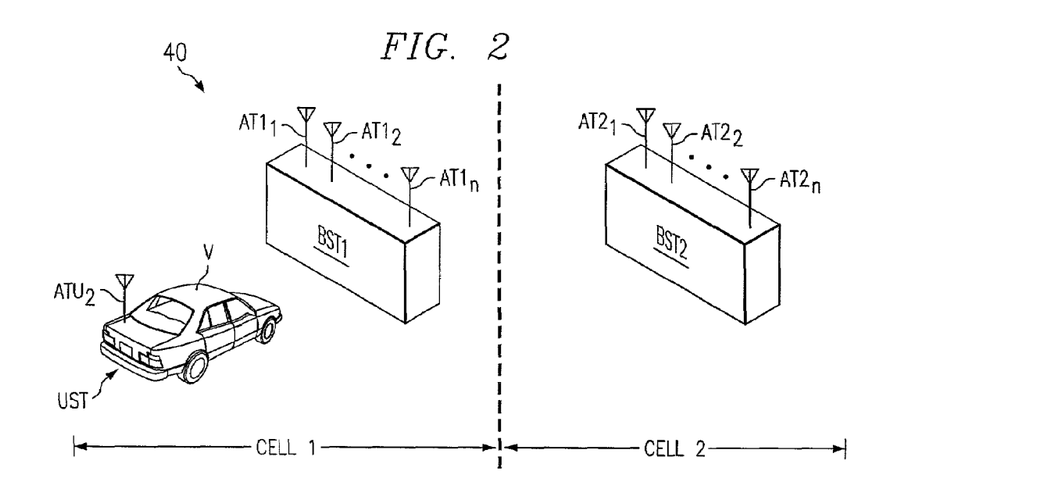
FIG. 2 illustrates a diagram of a cellular communications system by way of a contemporary code division multiple access ("CDMA") example in which the preferred embodiments operate.

FIG. 2 illustrates a diagram of a cellular communications system 40 by way of a contemporary code division multiple access ("CDMA") example, or a wideband code division multiple access ("WCDMA") example, in which the preferred embodiments operate. Thus, the following references to CDMA apply equally to WCDMA unless WCDMA is explicitly specified. Within system 40 are shown two base stations BST1 and BST2. Each base station BST1 and BST2 includes a respective set of antennas $AT1_1$ through $AT1_n$ and $AT2_1$ through $AT2_n$ through which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Further in this regard, system 40 also includes a user station UST, which is shown in connection with a vehicle V to demonstrate that user station UST is mobile. By way of example, user station UST includes a single antenna $ATU_2$ for both transmitting and receiving cellular communications. Lastly, as well known in contemporary uses, user station UST often may be in the form of a hand-held cellular telephone device or other comparable device that incorporates a mobile cellular transmitter and receiver. Such a device may move freely within vehicle V or it may be attached therein and electrically wired to communicate via antenna $ATU_2$ or, alternatively, such a device may have its own attached antenna.

In some respects, system 40 may operate according to known general techniques for various types of cellular or other spread spectrum communications, including CDMA communications. Such general techniques are known in the art and include the commencement of a call from user station UST and the handling of that call by either or both of base stations BST1 and BST2. This handling typically involves causing communications originated by user station UST to be communicated from a base station to a different user station. In other words, while FIG. 2 illustrates only a single user station UST for simplicity, the construction and operation of CDMA systems contemplates multiple user stations. Thus, a first user station may place a call to communicate with a second user station, where the two user stations are either in the same or different cells, and with the handling of those calls being via one or more base stations.

Figure 3:
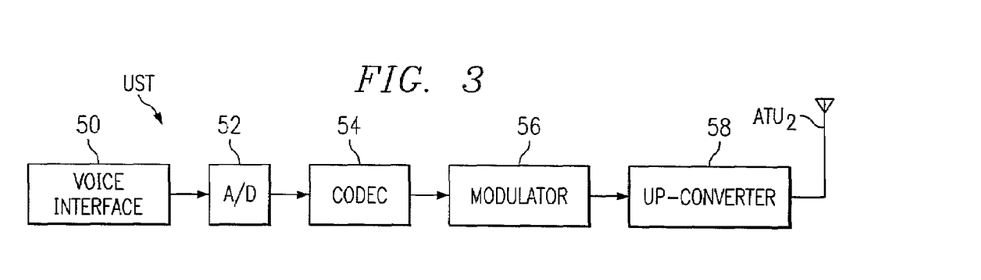
FIG. 3 illustrates an electrical block diagram of a transmitter in accordance with the preferred embodiment and which may be used within user station UST in FIG. 2.

FIG. 3 illustrates an electrical block diagram of user station UST from FIG. 2. By way of introduction, the blocks in FIG. 3 are generalized to depict the transmit functionality described below, and one skilled in the art may readily ascertain that various functions may be further separated as well as added to those shown and described. In addition, the block diagram of FIG. 3 generally could be used to represent a prior art user station, although the preferred embodiment is also represented by the illustration of FIG. 3 and is improved given improvements to the up-converter circuit and functionality as detailed below. Lastly, while user station UST depicted in FIG. 3 is only shown to include transmit functionality, one skilled in the art will readily appreciate that the preferred embodiment typically also includes receiver circuitry to accomplish receiving functionality. Such additional circuitry and functionality are generally not described in order to simplify the remaining discussion and to focus on the transmit portions of user station UST. Nonetheless, the present inventive scope contemplates a user station that includes both transmit and receive circuitry and functionality.

Turning to user station UST in FIG. 3, it includes a voice interface 50. Voice interface 50 includes sufficient circuitry for interacting with the user of user station UST and most commonly includes a microphone and a speaker. The microphone converts the voice into an analog electrical signal that is output to an input of an analog-to-digital ("A/D") converter 52. The digital output of A/D converter 52 is connected as an input to a coder/encoder 54, typically referred to as a CODEC 54. CODEC 54 converts a voice signal to one of various types of encoded sample formats at a given frequency. The serial and digital format of CODEC 54 is output as an input to a modulator 56. Modulator 56 may include various different modulation stages, including by way of example a serial-to-parallel conversion as well as the spreading of the signal with various CDMA codes. Signal spreading could include codes such as Walsh codes as well as short and long codes. Filtering of the signal also may be accomplished in connection with modulator 56 so as to reduce or remove any unwanted frequency components. Still further, modulator 56 may separate the baseband signal one bit at a time into the I and Q branches for quadrature modulation (or other type of keyed shifting of the signal) to represent the voice data and prepare it in a baseband format for transmission. Finally, the output of modulator 56 is output to an up-converter 58 which has an output connected to a transmit antenna $ATU_2$. The preferred specifics relating to up-converter 58 are discussed below in connection with FIG. 4.

Figure 4:
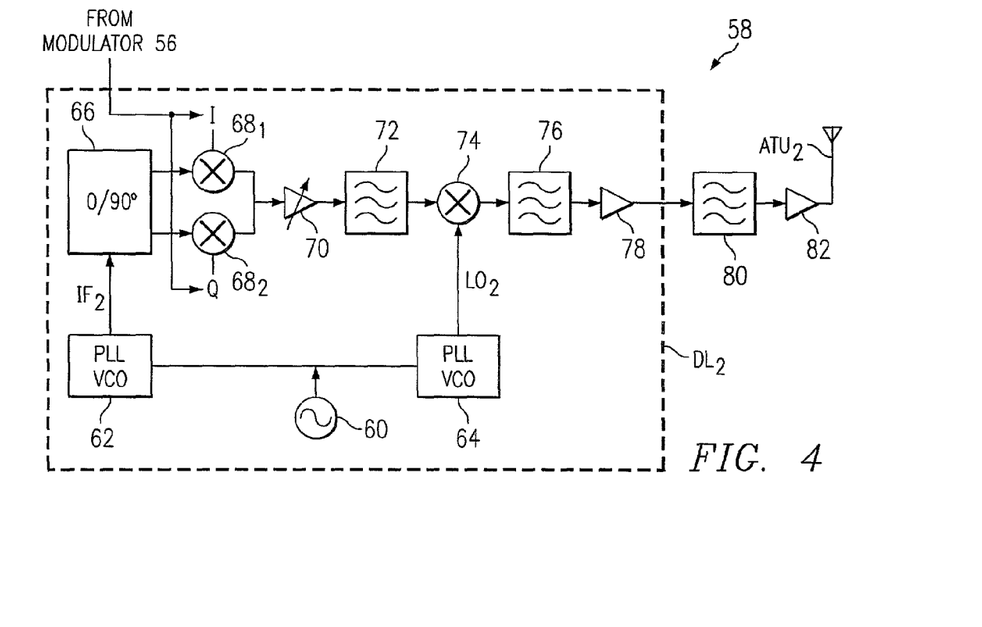
FIG. 4 illustrates an electrical block diagram of a preferred up-converter circuit to be used in the transmitter of FIG. 3.

FIG. 4 illustrates an electrical block diagram of up-converter 58 of FIG. 3 and according to the preferred embodiment. Up-converter 58 includes various components that are comparable to those discussed earlier with respect to up-converter 10 of FIG. 1 as will be recognized by one skilled in the art. For such components, the reader is assumed familiar with the earlier discussion and a lesser amount of detail is provided below. Instead, the focus below is on various aspects which distinguish up-converter 58 from up-converter 10 as well as the impact of those aspects on up-converter 58 as a whole.

Turning now to the details of FIG. 4, up-converter 58 includes a reference frequency generator 60 that provides a reference frequency to a first phase-locked-loop ("PLL") voltage-controlled oscillator ("VCO") 62 and also to a second PLL VCO 64. First PLL VCO 62 outputs a variable intermediate frequency ("$IF_2$") to a quadrature generator 66. As detailed below, each different frequency selection for the variable $IF_2$ is made in response to the desired final transmission channel frequency. Quadrature generator 66 produces two signals at the same frequency, namely, at the frequency of $IF_2$, where those two signals are separated from one another by a ninety degree phase shift. These two signals are connected along inputs to respective mixers $68_1$ and $68_2$, each of which receives a respective baseband input I and Q, which is quadrature multiplexed data provided from modulator 56 (see FIG. 3). The outputs of mixers $68_1$ and $68_2$ therefore provide signals with increased frequencies based on $IF_2$ from first PLL VCO 62, and those frequency-increased outputs are combined and then connected to an input of a variable gain amplifier 70. Variable gain amplifier 70 has its output connected to an input of a filter 72 as further discussed below.

Before proceeding with the description of the preferred embodiment up-converter 58, it is noteworthy to observe three different distinctions between it and the prior up-converter 10 described earlier. First, $IF_2$ is a variable frequency. Note the contrast here in that the preferred embodiment implements a variable intermediate frequency (i.e., $IF_2$), whereas the prior art implements a fixed intermediate frequency (i.e., $IF_1$). Second, in the prior art, up-converter 58 requires a more complex surface acoustic wave ("SAW") filter 22 at the output of its variable gain amplifier 20, whereas for reasons detailed below the preferred embodiment is able to implement a less complex filter 72 at the output of its variable gain amplifier 70. Third, FIG. 4 also includes a dashed line $DL_2$ encompassing various of the blocks of up-converter 58. Dashed line $DL_2$ is intended to illustrate the boundaries of an integrated circuit used to implement up-converter 58 in the preferred embodiment, that is, all blocks within dashed line $DL_2$ are preferably included in a single integrated circuit. Having established dashed line $DL_2$, it may be contrasted to the boundary defined by dashed line $DL_1$ of the prior art in FIG. 1. More particularly, FIG. 4 illustrates that dashed line $DL_2$ of the preferred embodiment includes filter 72 as connected to the output of amplifier 70, while FIG. 1 illustrates that dashed line $DL_1$ of the prior art excludes filter 22 as connected to the output of amplifier 20. In other words, the preferred embodiment incorporates an additional filter 72 as an on-chip circuit formed within the integrated circuit and, hence, does not require two external SAW filters. Various benefits result through this additional integration. For example, overall device size and weight are reduced. As another example, the cost to integrate the additional filter 72 is very small as compared to the cost of having the extra SAW filter 22; thus, the overall cost for implementing up-converter 58 is reduced as compared to up-converter 10. In today's competitive marketplace, this cost savings may be considerably beneficial.

Returning to FIG. 4, the remaining connections of up-converter 58 are as follows. The output of filter 72 is connected as an input to a mixer 74. In addition to receiving the output of filter 72, mixer 74 receives at another input a local oscillator signal ("$LO_2$") from second PLL VCO 64. Like the prior art, the $LO_2$ signal is variable so as to select among different WCDMA transmission channels in the band including 1922.4 through 1977.4 MHz. However, in the preferred embodiment, $LO_2$ is established for high side injection (i.e., $LO_2$>final transmission channel frequency), that is, the difference of the frequencies, $LO_2$-$IF_2$, is equal to the final transmission channel frequency. Recall further that in the preferred embodiment the value of $IF_2$ is a variable value based on the desired channel along which data is to be transmitted, as further detailed below. Thus, for each transmission along a channel, the frequency of $LO_2$ also is adjusted so that the difference between it and $IF_2$ equals the final transmission channel frequency. In all events, therefore, the appropriate frequency for $LO_2$ is provided to mixer 74, which as a result of mixing the signals provided at its inputs thereby both adds and subtracts the frequencies of those signals (and harmonics thereof), and the output is connected as an input to an image reject filter 76 that filters the signal as described below. The output of image reject filter 76 is connected as an input to a driver 78, and the output of driver 78 is output from dashed line $DL_2$ and is therefore connected externally from the integrated circuit represented by dashed line $DL_2$. More specifically, the output of driver 78 is connected as an input to a first SAW filter 80. The output of first SAW filter 80 is connected as an input to a power amplifier 82. The output of power amplifier 82 is connected to an antenna $ATU_2$. Lastly, recall as shown in FIG. 3 that up-converter 58 is part of a transmitter in user station UST, and user station UST is preferably accompanied by a receiver circuit or circuitry. In this regard and although not shown for sake of simplicity, the output of power amplifier 82 is also preferably connected to a duplex circuit. The duplex circuit connects to the receiver circuit so that the signals from power amplifier 82 for transmission may be suppressed with respect to the receiver functionality so as not to interfere with that receiver and its operation.

Before proceeding with a discussion of the operation of up-converter 58, attention is returned to the prior art and one of its limitations with respect to its connection with its prior art SAW filter 22. Particularly, it is observed in connection with the present inventive scope that fixed intermediate frequency $IF_1$ (e.g., 380 MHz) of the prior art causes, among other things, a need for a complex and external filter such as SAW filter 22. Specifically, and as shown by example below, the use of a fixed 380 MHz value for $IF_1$ creates a spurious frequency at the harmonics defined in the following Equation 1:

$$\text{spurious signal} = |3*IF_1 - 2*LO_1| \qquad \text{Equation 1}$$

Equation 1 indicates that a spurious signal occurs relative to the third harmonic of $IF_1$ and the second harmonic of $LO_1$, where recall also that, for the prior art case of low side injection, $LO_1$ is bounded in the range of 1542.4 MHz<$LO_1$<1597.4 MHz. Thus, consider the case where $LO_1$ equals the low bound of this range, that is, when $LO_1$=1542.4 MHz. In this case, then Equation 1 produces a spurious signal as shown in the following Equation 2:

$$\text{spurious signal} = |3*380 - 2*1542.4| = 1944.8 \qquad \text{Equation 2}$$

Equation 2, therefore, demonstrates that in the prior art case a spurious signal is created at 1944.8 MHz. Recall also that the transmission band for WCDMA signals is from 1922.4 through 1977.4 MHz. Thus, the spurious signal created by Equations 1 and 2 falls directly within this band. As a result of this design, the prior art necessarily includes a complex SAW filter 22 that is sufficient to significantly attenuate this spurious signal because otherwise it would interfere with the very type of unit (i.e., WCDMA) as the unit transmitting the signal. Indeed, in the prior art, SAW filter 22 is designed to attenuate the third harmonic of $IF_1$ (i.e., 3*$IF_1$) by typically at least 30 dB in order to meet spurious suppression requirements. In addition, note that the band of GPS transmissions is from 1573 MHz through 1578 MHz. Thus, for some transmissions, the value of $LO_1$ in the prior art, as it passes through the range of 1542.4 MHz<$LO_1$<1597.4 MHz, sweeps through the GPS band, and this also is undesirable.

Returning to the inventive up-converter 58 and having detailed its connections as well as the drawbacks of the prior art up-converter 10, one skilled in the art should further appreciate the operation of up-converter 58, which is now described. Generally, various aspects of up-converter 58 operate in the same manner as up-converter 10 described earlier and, thus, such aspects are only briefly stated here. For sake of reference, it is noted that up-converter 58, like up-converter 10, also provides a first and second increase in the frequency of the baseband signal. However, in the preferred embodiment, the first frequency increase is in response to the variable intermediate frequency $IF_2$. The second frequency increase is in response to the variable local oscillator frequency $LO_2$. Ultimately, the twice-frequency adjusted signal passes through the rest of the circuits shown in FIG. 4 and the signal at the final transmission channel frequency is transmitted via antenna $ATU_2$. The difference arising from the variable intermediate frequency $IF_2$ as well as other differences are the focus of the remaining operational discussion.

Figure 5:
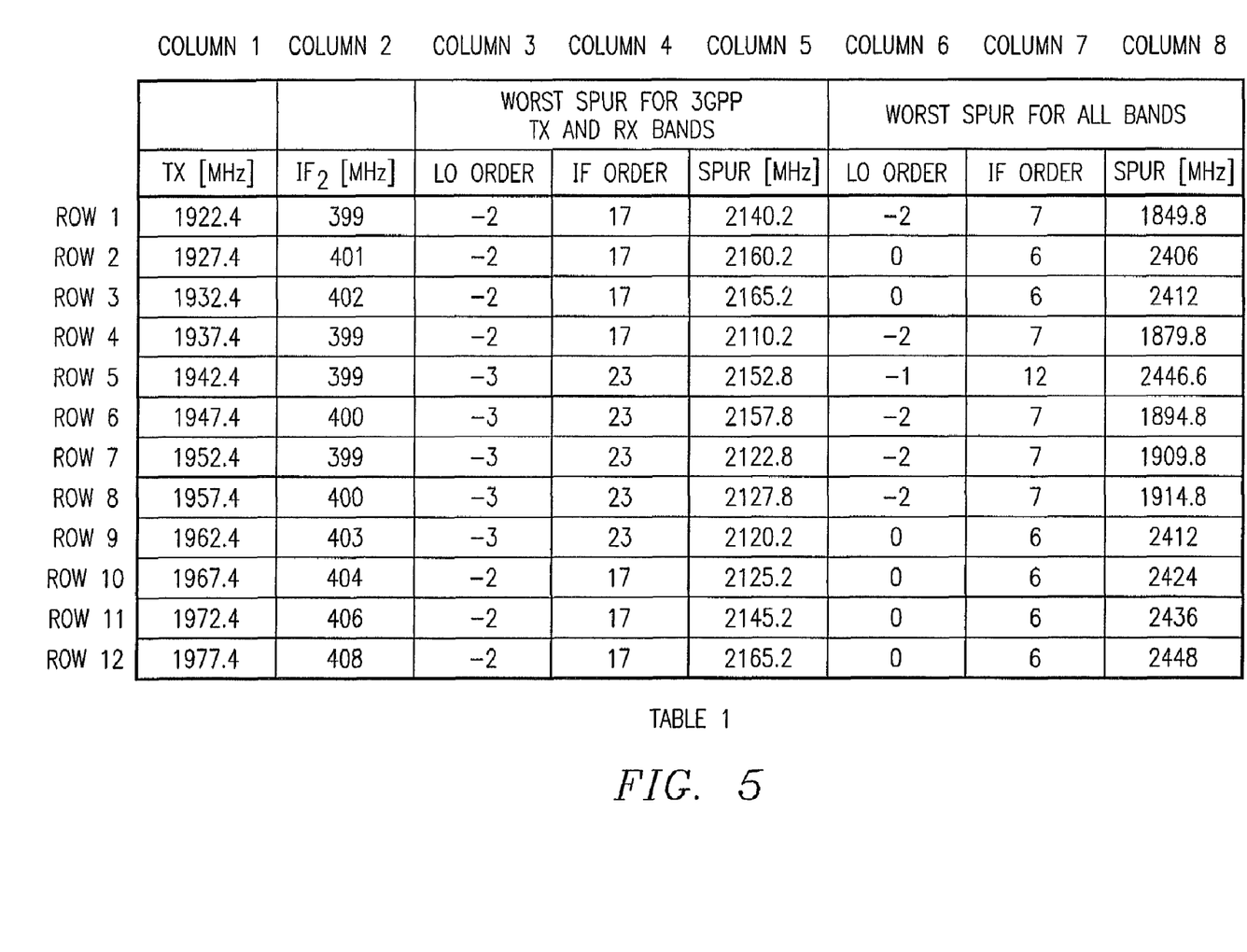
FIG. 5 illustrates a Table 1 that depicts the variability of the intermediate frequency of the preferred embodiment along with the resulting worst case spurious signals in both the WCDMA band as well as in other wireless bands.

Recall in the preferred embodiment that each different selection of the variable $IF_2$ is made in response to the desired final transmission channel frequency. FIG. 5 illustrates a Table 1 that more precisely demonstrates this variability and selection. Specifically, column 1 of Table 1 indicates a range of differing final transmission ("TX") channel frequencies for WCDMA communications, and column 2 illustrates of Table 1 indicates the corresponding preferred value of $IF_2$ for a given communication along the column 1 WCDMA channel. For example, as shown in row 1 of Table 1, for a final transmission channel frequency of 1922.4 MHz, then first PLL VCO 62 causes $IF_2$ to equal a value of 399 MHz. As another example, as shown in row 2 of Table 1, for a final transmission frequency band of 1927.4 MHz, then first PLL VCO 62 causes $IF_2$ to equal a value of 401 MHz. Each remaining example of a different final transmission channel frequency and the respective value of $IF_2$ will be appreciated from the remaining rows in Table 1. Thus, Table 1 demonstrates that for the WCDMA channels from 1922.4 MHz through 1977.4 MHz, then $IF_2$ in the preferred embodiment ranges from 399 MHz through 408 MHz, and in each case the value of $IF_2$ is selected in response to a particular channel within the WCDMA set of frequency channels along which a transmission is desired at a given time. Further, assuming the preferred instance of high side injection, then the value for $LO_2$ is readily ascertainable given that $IF_2$ and the final transmission channel frequency are known, and given that the difference of $LO_2$ and $IF_2$ equals the final transmission channel frequency. For example, for row 1 of Table 1 wherein the final transmission channel frequency equals 1922.4 MHz and $IF_2$ equals 399 MHz, then $LO_2$ equals 2321.4 MHz (i.e., $LO_2-IF_2=2321.4-399=1922.4$ MHz). Lastly, note that the provision of a given frequency by first PLL VCO 62 and by second PLL VCO 64 may be controlled using various circuits. For example, although not shown, an external connection to the integrated circuit provided within dashed line $DL_2$ may be provided wherein a control signal along that connection provides the band for a given transmission, and that signal also may therefore cause or indicate the selection of the corresponding values for $IF_2$ and $LO_2$ corresponding to that channel. This control signal may be provided by various external circuits, including by way of example a digital signal processor ("DSP") such as one of the DSPs commercially available from Texas Instruments Incorporated.

Given that the preferred embodiment implements a varied value for $IF_2$, it is recognized in connection with the present inventive scope that such an approach will still create spurious signals at harmonics of $IF_2$, $LO_2$, and the sum and difference of $IF_2$ and $LO_2$ and their harmonics. However, such spurious signals have been considered and are further explored in Table 1 of FIG. 5 and shown to be considerably improved as compared to the prior art. Specifically, columns 3 through 5 of Table 1 illustrate the worst case spurious signals (i.e., strongest magnitude) that occur in the WCDMA receive band, and columns 6 through 8 illustrate the worst case spurious signals that occur in a group that includes numerous other wireless bands. Each of these instances is described separately below.

Turning to the case of spurious signals in the WCDMA receive band, column 5 of Table 1 illustrates the frequency of the worst spurious signal that occurs in that band, for the respective value of $IF_2$ (column 2) used at the respective transmission channel (column 1). For example, row 1 of Table 1 shows that the worst spurious signal occurs at 2140.2 MHz in the preferred embodiment when transmitting at the WCDMA channel of 1922.4 MHz using $IF_2=399$ MHz. As another example, row 2 of Table 1 shows that the worst spurious signal occurs at 2160.2 MHz in the preferred embodiment when transmitting at the WCDMA channel of 1927.4 MHz using $IF_2=401$ MHz. The remaining examples of Table 1 will therefore be understood by one skilled in the art. Given the various frequencies of the worst case WCDMA spurious signals in column 5, these signals also may be characterized by the harmonics that create them. By reviewing columns 3 and 4, one skilled in the art will appreciate that the worst case among all the worst-case spurious signals is that which has the smallest order, where the order is the sum of the absolute value of each of the harmonics for a given signal. For example, the order of the harmonics of the earlier Equation 1 is equal to five (i.e., $|3|+|-2|=5$). Looking at columns 3 and 4 of Table 1, therefore, it may be seen that the worst case among all the worst-case spurious signals is shown in each of rows 1 through 4 and 10 through 12, where the harmonics in those rows are shown by the following Equation 3:

$$\text{worst case spurious signal} = |17*IF_2 - 2*LO_2| \qquad \text{Equation 3}$$

Given Equation 3, note that the worst case signal it describes includes a seventeenth order signal (i.e., $17*IF_2$) that necessarily is provided along the output of amplifier 70 since $IF_2$ is introduced into the input of amplifier 70 (i.e., from PLL VCO 62 and then via generator 66 and mixers $68_1$ and $68_2$). This seventeenth order signal therefore is much farther in frequency distance from $IF_2$ as compared to the distance between the prior art spurious signal at $3*IF_1$ relative to the fixed value of $IF_1$ (as described earlier by Equation 1). Moreover, recall from above that prior art-upconverter 10 required at least a 30 dB attenuation at this third harmonic of the prior art fixed intermediate frequency $IF_1$ (i.e., $3*IF_1$). In contrast, note that Equation 3 indicates that for the preferred embodiment the worst case spurious does not at all relate to the third harmonic of the preferred embodiment variable intermediate frequency $IF_2$ (i.e., $3*IF_2$). As a result, while the prior art required the considerably complex SAW filter 22 on the output of variable gain amplifier 20, by implementing the variable intermediate frequency $IF_2$ in the preferred embodiment, there is a considerable reduction in the filtering requirements on the output of variable gain amplifier 70. As a result, there is the ability to implement a less complex filter 72 than that required by the prior art. Further, because the preferred embodiment can implement such a less complex filter, that filter may be integrated within the integrated circuit represented by dashed line $DL_2$, whereas present technology does not permit the integration of the prior art SAW filter. Consequently, device size, weight, and cost may be reduced.

Figure 6:
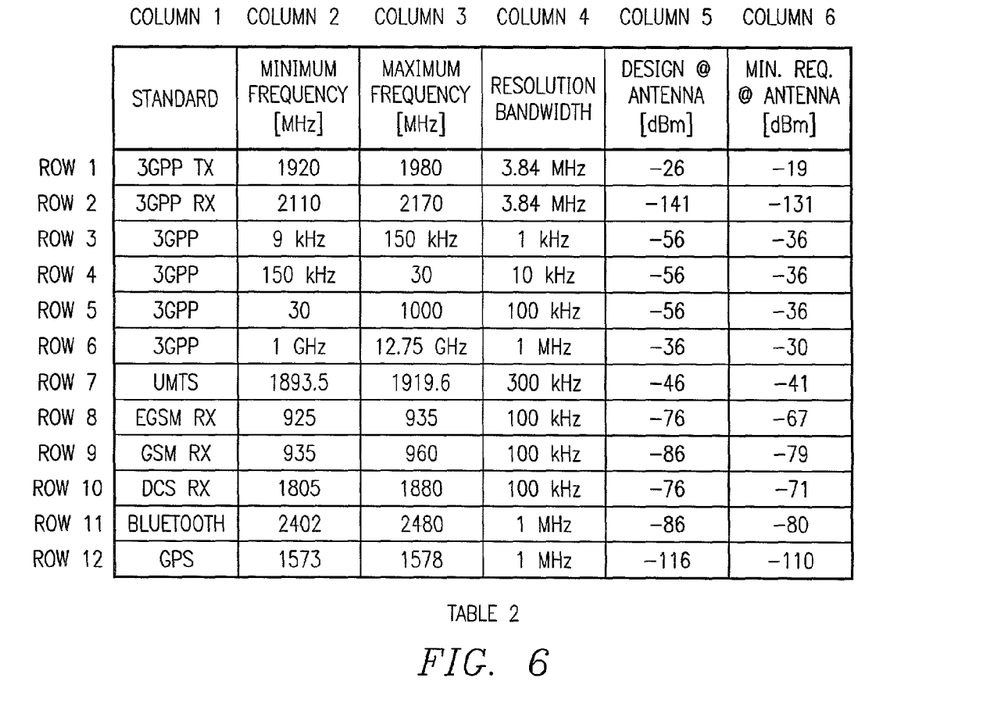
FIG. 6 illustrates a Table 2 that depicts the WCDMA band as well as other wireless bands, and it also illustrates the spurious signal attenuation existing at the transmit antenna in these bands as a result of the preferred embodiment.

Turning to the case of spurious signals in bands other than WCDMA as a result of the preferred embodiment, reference is made to Table 2 shown in FIG. 6. Column 1 of Table 2 illustrates various different wireless standards, and columns 2 through 4 specify various transmission frequency parameters relating to each such respective standard. In addition, column 6 specifies the minimum requirement for the amount of signal attenuation for spurious signals within the band for the corresponding standard. For example, row 1 of Table 2 specifies that for the 3GPP TX standard, the standard specifies that within the band of 1920 MHz through 1980 MHz, the standard permits at most a spurious signal of −19 dBm. In contrast, column 5 of Table 2 specifies the simulated expected result provided by the preferred embodiment, where it can be seen that the preferred embodiment satisfies and indeed exceeds the requirements for each listed standard. Thus, returning to the example of row 1 pertaining to the 3GPP TX standard which permits at most a spurious signal of −19 dBm (column 6), column 5 of that row indicates that the preferred embodiment provides a spurious signal of only −26 dBm. Thus, the standard is more than satisfied. A comparison of columns 5 and 6 in the remainder of Table 2 demonstrates that the remaining standards are likewise met and exceeded by the preferred embodiment.

Having discussed the creation of spurious signals by the preferred embodiment with respect to various different standards, attention is returned to Table 1 of FIG. 5 and its remaining columns 6 through 8. Looking first to column 8, it specifies the worst spurious signal for all of the standards in column 1 of Table 2 in FIG. 6. For example, in row 1 of Table 1, column 6 specifies that the worst spurious signal is at 1849.8 MHz, which from Table 2 can be seen to fall within the DCS RX band. As another example, in row 2 of Table 1, column 6 specifies that the worst spurious signal is at 2406 MHz, which from Table 2 can be seen to fall within the Bluetooth band. The remaining examples of Table 2 will therefore be understood by one skilled in the art. Given the various frequencies of the worst case spurious signals in column 6, each of these signals also may be characterized by the harmonics that create them. Indeed, columns 6 and 7 of Table 1 specify the harmonics corresponding to each such worst-case spurious signal. For example, in row 1 of Table 1, columns 6 and 7 specify that the worst-case spurious signal of 1849.8 MHz is created from the harmonics set forth in the following Equation 4:

$$\text{worst case spurious signal} = |-2*IF_2 + 7*LO_2| \qquad \text{Equation 4}$$

Columns 6 and 7 across the remaining rows of Table 1, therefore, demonstrate the remaining harmonics giving rise to the worst case spurious signals across the various standards of Table 2. By reviewing columns 6 and 7 of Table 1, one skilled in the art will appreciate that the worst case among all the worst-case spurious signals therein is as shown by the lowest-order harmonic, which is shown by the following Equation 5:

$$\text{worst of the worst-case spurious signals} = |6*IF_2 + 0*LO_2| \qquad \text{Equation 5}$$

From Equation 5, it may be seen that the sixth harmonic of $IF_2$ (i.e., $6*IF_2$) should be filtered to reduce spurious signals with respect to all the bands in Table 2, and again the distance of this harmonic from $IF_2$ is far greater than the prior art distance between its $IF_1$ and its associated spurious harmonic at $3*IF_1$. The preceding demonstrates that by varying $IF_2$, this allows spurious spectral energy to be reduced for numerous wireless frequency bands.

From the above, it may be appreciated that the above embodiments provide an improved wireless communications system and particularly one that includes a transmitter that implements a varying intermediate frequency in its up-converter. Further, while the present embodiments have been described in detail, various substitutions, modifications or alterations could be made to the descriptions set forth above without departing from the inventive scope. For example, the preferred embodiment has been shown to have particular benefit in a WCDMA system, but other indirect up-converters may benefit from the present teachings. As another example, while various block diagrams have shown certain functionality above, certain of these functions may be modified, or indeed other functions may be added or removed from various block devices while still incorporating the inventive teachings. In a comparable regard, while a preferred boundary has been illustrated within which various blocks are integrated in a single integrated circuit, other alternatives may be established. As yet another example, while column 1 of Table 1 illustrates increments of 5 MHz and corresponding values for $IF_2$, it should be understood that the varying of $IF_2$ can be performed with increments as small as the lowest common comparison frequency for PLL VCO 62 and 64 (or comparable synthesizers) which generate $IF_2$ and $LO_2$, where this value is likely lower than the 5 MHz increment shown in Table 1. Indeed, presently in the case of WCDMA, this common comparison frequency is 200 kHz. In addition, while the preferred embodiment is described above with respect to high side injection by $LO_2$ in that such an approach further reduces spurious spectral energy of interest, another contemplated alternative is to provide the preceding with a low side injection approach. Thus, the inventive scope further contemplates the preceding examples and teachings as well as other modifications ascertainable by one skilled in the art, all thereby further evidencing the inventive scope which is defined by the following claims.

The invention claimed is:
1. A wireless communication device, comprising:
   an input for receiving baseband data in a first signal having a first frequency;
   circuitry for increasing the first frequency, to form a second signal having a second frequency, in response to a first frequency reference signal;
   circuitry for increasing the second frequency, to form a third signal having a third frequency, in response to a second frequency reference signal;
   an antenna for transmitting the baseband data at a final transmission channel frequency selected as a channel from among a band comprising a predetermined set of frequency channels; and
   wherein the first frequency reference signal is variable and is selected to have a first value and the second frequency reference signal is variable and is selected to have a second value, where the first value and the second value are selected in a first instance in response to a first final transmission channel frequency selected as a channel from among the band; and
   wherein the first frequency reference signal is variable and is selected to have a third value differing from the first value and the second frequency reference signal is variable and is selected to have a fourth value differing from the third value, where the third value and the fourth value are selected in a second instance in response to a second final transmission channel frequency selected as a channel from among the band.
2. The wireless communication device of claim 1 and further comprising:
   circuitry for amplifying the second signal to produce an amplified second signal;
   circuitry for filtering the amplified second signal;
   wherein the third signal is in response to the amplified second signal; and
   wherein all of the circuitry for increasing the first frequency, the circuitry for increasing the second fre- quency, the circuitry for amplifying, and the circuitry for filtering are on a common integrated circuit.

3. The wireless communication device of claim 2 and further comprising:
   circuitry for filtering the third signal to form a third amplified signal;
   circuitry for increasing power of the third amplified signal to form a fourth signal; and
   wherein the circuitry for filtering the third signal and the circuitry for increasing power of the third amplified signal are on the common integrated circuit.

4. The wireless communication device of claim 3 and further comprising:
   circuitry for filtering the fourth signal to form a filtered fourth signal; and
   circuitry, coupled to the antenna, for increasing power of the filtered fourth signal.

5. The wireless communication device of claim 4 wherein the circuitry for filtering the fourth signal and the circuitry, coupled to the antenna, for increasing power of the filtered fourth signal are external from the common integrated circuit.

6. The wireless communication device of claim 1 wherein a sum of the first frequency reference signal and the second frequency reference signal equals the final transmission channel frequency.

7. The wireless communication device of claim 1 wherein a difference between the second frequency reference signal and the first frequency reference signal equals the final transmission channel frequency.

8. The wireless communication device of claim 1:
   wherein the predetermined set of frequency channels comprise channels in a range comprising approximately 1920 MHz through 1980 MHz; and
   wherein the first frequency reference signal varies in a range comprising approximately 399 MHz through 408 MHz.

9. The wireless communication device of claim 8 wherein the predetermined set of frequency channels comprise WCDMA channels.

10. The wireless communication device of claim 1 and further comprising circuitry for receiving wireless communications.

11. The wireless communication device of claim 1:
    wherein the circuitry for increasing the first frequency and the circuitry for increasing the second frequency are on a common integrated circuit; and
    wherein the first frequency reference signal is selected in response to a signal from a circuit external from the common integrated circuit.

12. The wireless communication device of claim 11 wherein the circuit external from the common integrated circuit comprises a digital signal processor.

13. The wireless communication device of claim 1 and further comprising:
    a voice interface for converting audible signals into an analog electrical signal;
    an analog-to-digital converter for converting the analog electrical signal into a digital electrical signal;
    a coder/encoder for converting the digital electrical signal to an encoded sample format; and
    a modulator for modulating the encoded sample format.

14. A wireless communication device, comprising:
    an input for receiving baseband data in a first signal having a first frequency;
    circuitry for increasing the first frequency, to form a second signal having a second frequency, in response to a first frequency reference signal;
    circuitry for increasing the second frequency, to form a third signal having a third frequency, in response to a second frequency reference signal;
    an antenna for transmitting the baseband data at a final transmission channel frequency selected as a channel from among a band comprising a predetermined set of frequency channels;
    circuitry for amplifying the second signal to produce an amplified second signal;
    circuitry for filtering the amplified second signal;
    wherein the third signal is in response to the amplified second signal;
    wherein the first frequency reference signal is variable and is selected to have a first value and the second frequency reference signal is variable and is selected to have a second value, where the first value and the second value are selected in a first instance in response to a first final transmission channel frequency selected as a channel from among the band; and
    wherein the first frequency reference signal is variable and is selected to have a third value differing from the first value and the second frequency reference signal is variable and is selected to have a fourth value differing from the third value, where the third value and the fourth value are selected in a second instance in response to a second final transmission channel frequency selected as a channel from among the band;
    wherein all of the circuitry for increasing the first frequency, the circuitry for increasing the second frequency, the circuitry for amplifying, and the circuitry for filtering are on a common integrated circuit;
    wherein the predetermined set of frequency channels comprise channels in a range comprising approximately 1920 MHz through 1980 MHz; and
    wherein the first frequency reference signal varies in a range comprising approximately 399 MHz through 408 MHz.

15. The wireless communication device of claim 14 and further comprising circuitry for receiving wireless communications.

16. The wireless communication device of claim 14 wherein the circuitry for increasing the first frequency and the circuitry for increasing the second frequency.

17. A method of operating a wireless communication device, comprising:
    receiving baseband data in a first signal having a first frequency;
    increasing the first frequency, to form a second signal having a second frequency, in response to a first frequency reference signal;
    increasing the second frequency, to form a third signal having a third frequency, in response to a second frequency reference signal;
    transmitting the baseband data along an antenna and at a final transmission channel frequency selected as a channel from among a band comprising a predetermined set of frequency channels; and
    wherein the first frequency reference signal is variable and is selected to have a first value and the second frequency reference signal is variable and is selected to have a second value, where the first value and the second value are selected in a first instance in response to a first final transmission channel frequency selected as a channel from among the band; and wherein the first frequency reference signal is variable and is selected to have a third value differing from the first value and the second frequency reference signal is variable and is selected to have a fourth value differing from the third value, where the third value and the fourth value are selected in a second instance in response to a second final transmission channel frequency selected as a channel from among the band.

18. The method of claim 17:
wherein the predetermined set of frequency channels comprise channels in a range comprising approximately 1920 MHz through 1980 MHz; and
wherein the first frequency reference signal varies in a range comprising approximately 399 MHz through 408 MHz.

19. The method of claim 18 wherein the predetermined set of frequency channels comprise WCDMA channels.

20. A wireless communication device, comprising:
an input for receiving baseband data in a first signal having a first frequency;
circuitry for increasing the first frequency, to form a second signal having a second frequency, in response to a first frequency reference signal;
circuitry for increasing the second frequency, to form a third signal having a third frequency, in response to a second frequency reference signal;
an antenna for transmitting the baseband data at a final transmission channel frequency selected as a channel from among a band comprising a predetermined set of frequency channels; and wherein the first frequency reference signal is variable and is selected from among one of a plurality of different values corresponding to the band and the second frequency reference signal is variable and is selected from among one of a plurality of different values in response to the first frequency reference signal and the final transmission channel frequency.

21. The wireless communication device of claim 20 wherein a sum of the first frequency reference signal and the second frequency reference signal equals the final transmission channel frequency.

22. The wireless communication device of claim 20 wherein a difference between the second frequency reference signal and the first frequency reference signal equals the final transmission channel frequency.

23. The wireless communication device of claim 20:
wherein the predetermined set of frequency channels comprise channels in a range comprising approximately 1920 MHz through 1980 MHz; and
wherein the first frequency reference signal varies in a range comprising approximately 399 MHz through 408 MHz.

24. The wireless communication device of claim 20 wherein the predetermined set of frequency channels comprise WCDMA channels.

* * * * *